(12) United States Patent
Kase

(10) Patent No.: US 10,837,428 B2
(45) Date of Patent: Nov. 17, 2020

(54) COIL SPRING UNIT, DRIVING FORCE TRANSMITTING DEVICE AND IMAGE FORMING APPARATUS

(71) Applicant: CANON KABUSHIKI KAISHA, Tokyo (JP)

(72) Inventor: Shota Kase, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/796,209

(22) Filed: Feb. 20, 2020

(65) Prior Publication Data

US 2020/0191126 A1 Jun. 18, 2020

Related U.S. Application Data

(62) Division of application No. 15/837,415, filed on Dec. 11, 2017, now Pat. No. 10,590,917.

(30) Foreign Application Priority Data

Dec. 13, 2016 (JP) ................. 2016-240786

(51) Int. Cl.
| | | |
|---|---|---|
| *G03G 15/00* | (2006.01) | |
| *F16F 3/04* | (2006.01) | |
| *F03G 1/02* | (2006.01) | |
| *G03G 21/16* | (2006.01) | |
| *F16D 43/202* | (2006.01) | |
| *F16F 1/12* | (2006.01) | |
| *F16H 1/20* | (2006.01) | |
| *F16D 41/18* | (2006.01) | |

(52) U.S. Cl.
CPC ............. *F03G 1/02* (2013.01); *F16D 43/202* (2013.01); *F16F 1/12* (2013.01); *G03G 15/757* (2013.01); *G03G 21/1647* (2013.01); *F16D 41/185* (2013.01); *F16H 1/20* (2013.01); *G03G 2221/1657* (2013.01)

(58) Field of Classification Search
CPC ............. G03G 15/757; G03G 21/1647; G03G 2221/1657; F03G 1/02; F16D 43/202; F16D 41/185; F16F 1/12; F16H 1/20
See application file for complete search history.

(56) References Cited

U.S. PATENT DOCUMENTS

| | | |
|---|---|---|
| 2,275,740 A | 3/1942 | De Orlow |
| 5,281,043 A | 1/1994 | Hsu |
| 6,282,760 B1 | 9/2001 | Mars |

(Continued)

FOREIGN PATENT DOCUMENTS

| | | |
|---|---|---|
| JP | 04-095136 U | 8/1992 |
| JP | 06-069446 U | 9/1994 |

(Continued)

*Primary Examiner* — Sophia S Chen
(74) *Attorney, Agent, or Firm* — Venable LLP

(57) ABSTRACT

A coil spring unit includes a coil spring; and a metal plate supporting the coil spring, the metal plate including a plurality of supporting portions cooperative with each other to support the coil spring, wherein the supporting portions are provided by bending the metal plate at bending lines and have supporting surfaces substantially perpendicular to the bending lines, respectively, and wherein the supporting surfaces are substantially parallel with outside tangential lines of the coil spring and support the coil spring.

7 Claims, 10 Drawing Sheets

(56) References Cited

U.S. PATENT DOCUMENTS 10,590,917 B2 * 3/2020 Kase .................... F03G 1/02
2018/0143579 A1    5/2018 Kase

FOREIGN PATENT DOCUMENTS

| JP | 06-087343 U    | 12/1994 |
| JP | 07-240056 A    | 9/1995  |
| JP | H08-277867 A   | 10/1996 |
| JP | 2001-238408 A  | 8/2001  |

* cited by examiner (a)

(b)

COIL SPRING UNIT, DRIVING FORCE TRANSMITTING DEVICE AND IMAGE FORMING APPARATUS

CROSS-REFERENCE TO RELATED APPLICATIONS

This application is a divisional of U.S. patent application Ser. No. 15/837,415, filed Dec. 11, 2017, which claims the benefit of Japanese Patent Application No. 2016-240786, filed Dec. 13, 2016, the entire disclosures of which are hereby incorporated by reference herein.

FIELD OF THE INVENTION AND RELATED ART

The present invention relates to a coil spring unit, a mechanical force transmitting device, and an image forming apparatus.

A coil spring has been in use in apparatuses in various fields. Referring to FIG. 10, there is disclosed in Japanese Utility Patent Application No. H06-69446, an apparatus structured so that a coil spring 102 is supported by a metallic member 103 having a pair of mutually opposing coil spring retaining portions. More specifically, the coil spring 102 is held to the metallic plate 103 by being sandwiched between the mutually opposing surfaces 101a of the pair of coil spring retaining portions, by its peripheral portion 102a.

This structural arrangement does not require additional components to keep the coil spring 102 held to the metallic plate 103. Thus, the structural arrangement disclosed in Japanese Utility Patent Applications No. H06-69446 is effective to reduce in cost an apparatus which employs a coil spring.

In the case of the structural arrangement disclosed in Japanese Utility Patent Application No. H06-69446, however, the efficiency with which the coil spring 102 can be inserted between the mutually opposing surfaces 101a in such a manner that the peripheral portion 102a of the coil spring 102 comes into contact with the surfaces 101a, was not taken into consideration. The coil spring retaining portions 101, shown in FIG. 10, are formed by putting a piece of metallic plate 103 through a combination of a process of punching and a process of bending. The bending process is affected not only by the error in the measurement of a metallic mold used for punching process, but also, by the errors in the bending process, which is attributable to the thickness and hardness of the metallic plate 103. Thus, the process of bending the portions of the metallic plate 103, which are the precursors of the coil spring retaining portions, tend to be low in accuracy. In other words, it is rather difficult to yield a pair of coil spring retaining portions, which is highly accurate in the distance between the mutually opposing two surfaces 101a.

Thus, it is customary to set the distance between the mutually facing two surfaces 101a to be larger than the external diameter of the coil spring 102. With the distance between the two surfaces 101a being set larger than the external diameter of the coil spring 102, it does not occur that the contact between the coil spring 102 and the surfaces 101a interferes with the insertion of the coil spring 102 between the two surfaces 101a. That is, the coil spring 102 can be easily inserted between the two surfaces 101a. This setup, however, has its own problem. That is, if the metallic plate 103 is vertically positioned as shown in FIG. 10 when the coil spring 102 is attached to the metallic plate 103, the coil spring 102 tends to slip out of the space between the two surfaces 101a, and fall.

SUMMARY OF THE INVENTION

The present invention is for solving the problem described above. Thus, the primary object of the present invention is to provide a coil spring unit which is superior to any conventional coil spring unit, in the efficiency with which a coil spring unit can be assembled.

According to an aspect of the present invention, there is provided a coil spring unit that includes a coil spring and a metal plate supporting said coil spring. Said metal plate includes a plurality of supporting portions cooperative with each other to support said coil spring, wherein said supporting portions are provided by bending said metal plate at bending lines and have supporting surfaces substantially perpendicular to the bending lines, respectively, and wherein said supporting surfaces are substantially parallel with outside tangential lines of said coil spring and support said coil spring.

Further features of the present invention will become apparent from the following description of exemplary embodiments.

Figure 5:
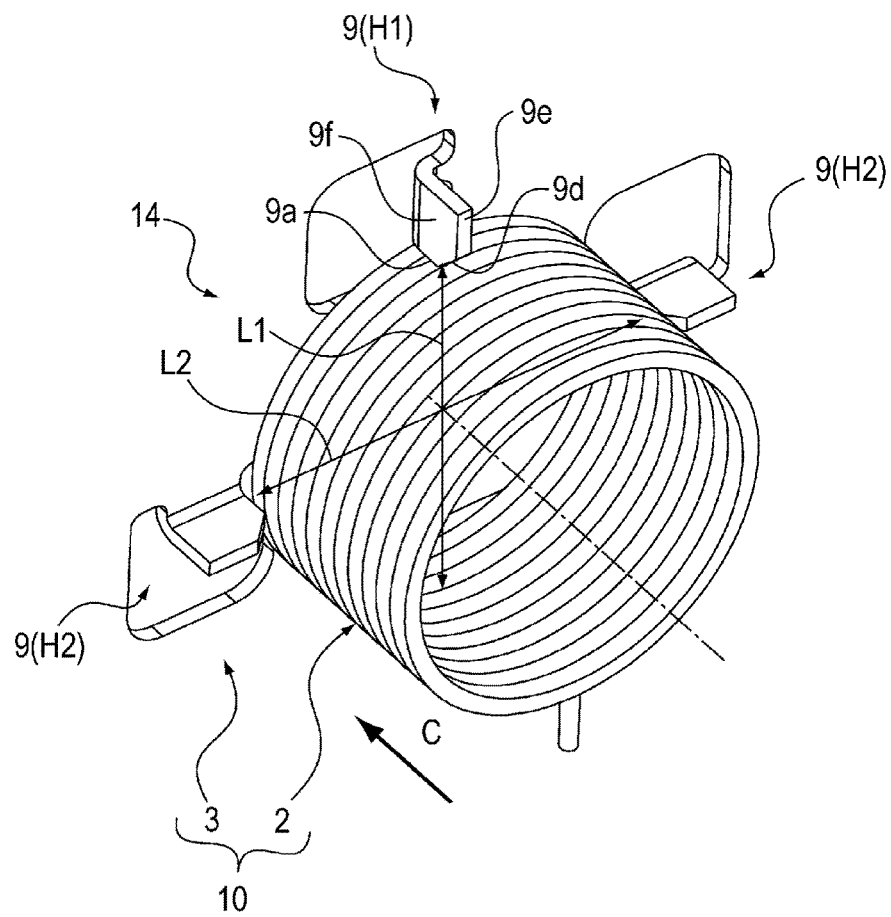
Figure 5:
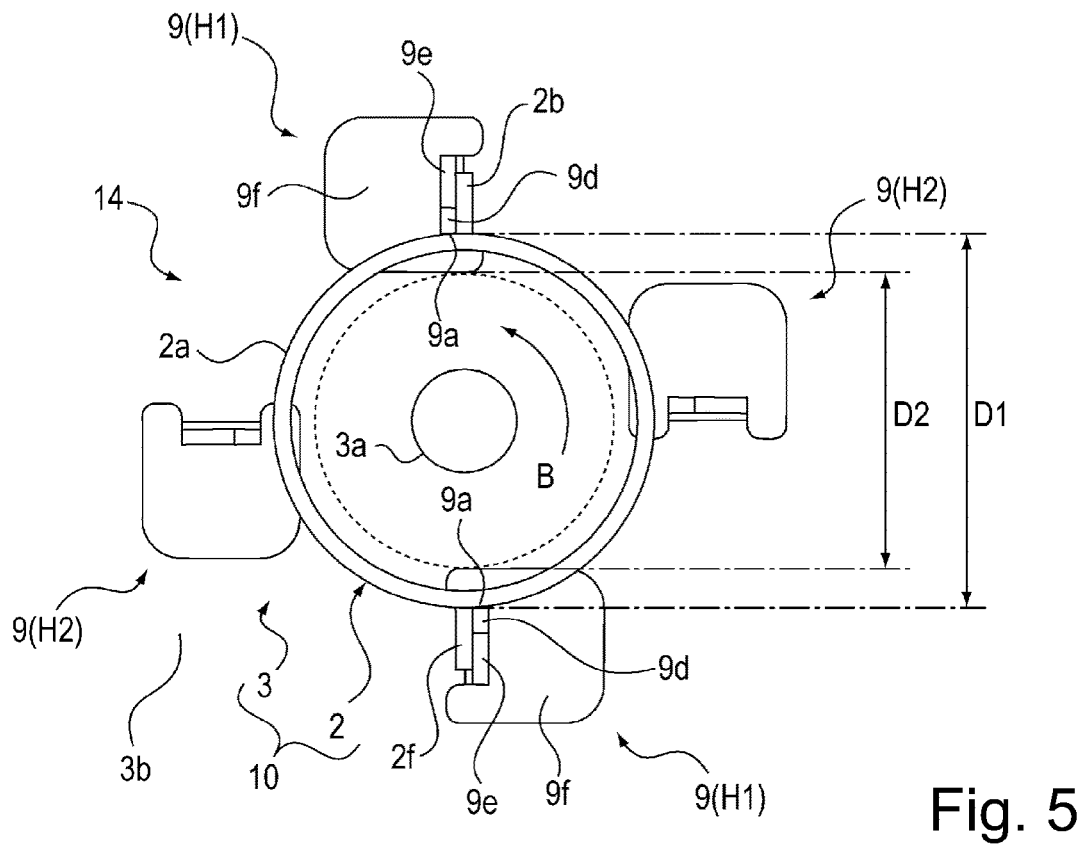

Part (a) of FIG. 5 is a perspective view of the assembled coil spring unit, and part (b) of FIG. 5 is a front view of the assembled coil spring unit.

Figure 6:
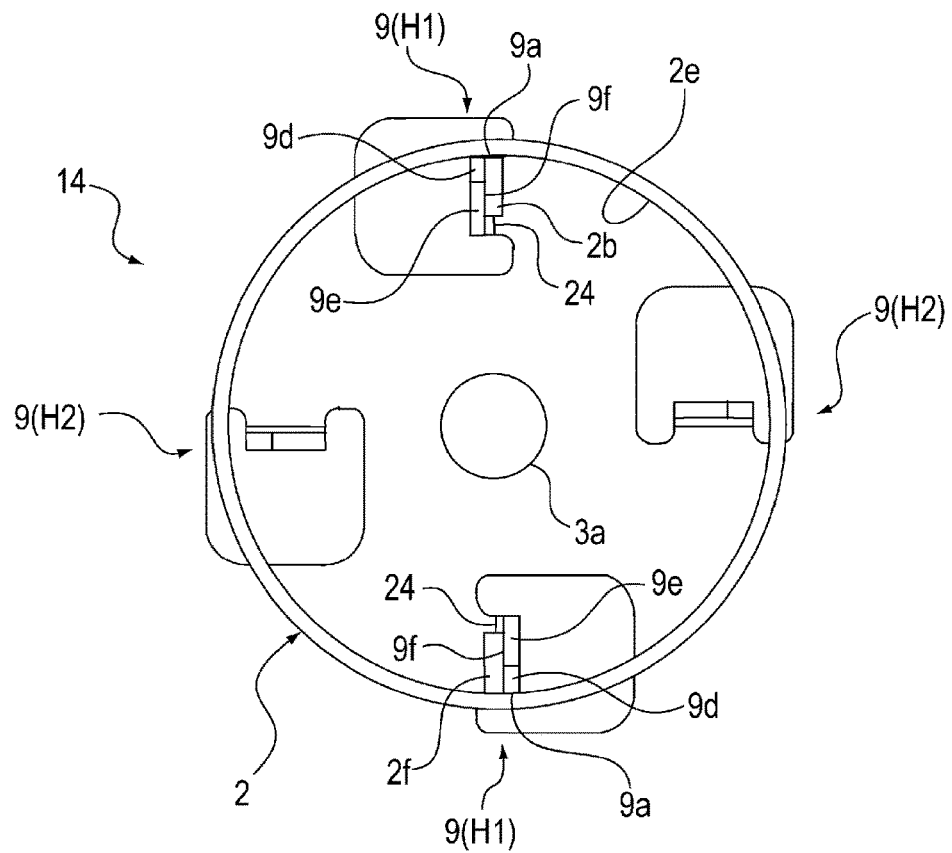
Figure 6:
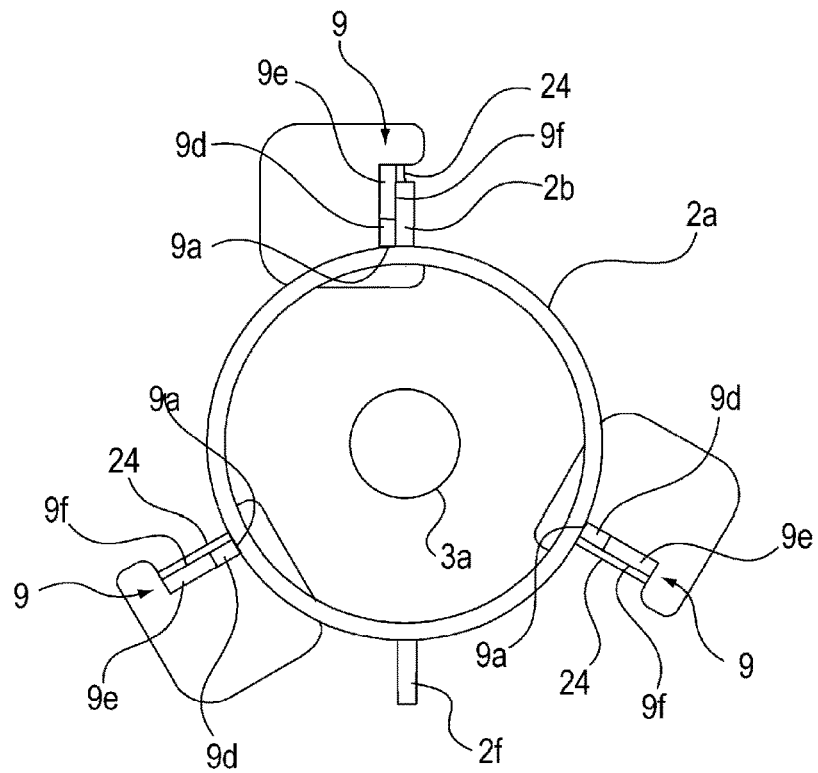

Part (a) of FIG. 6 is a schematic drawing of a modified version of the coil spring unit in the first embodiment, and part (b) of FIG. 6 is a schematic drawings of another modified version of the coil spring unit in the first embodiment.

Figure 7:
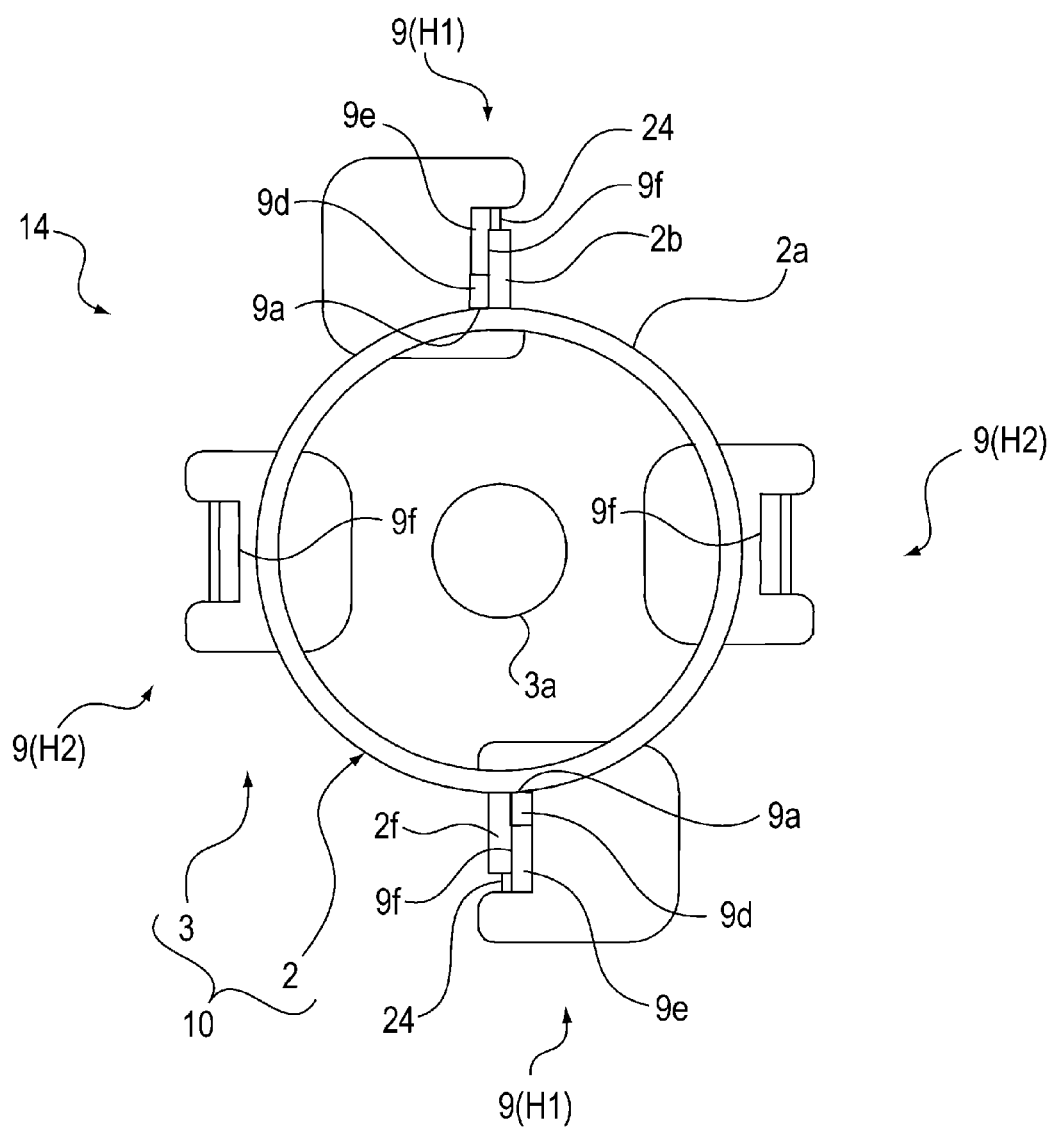

FIG. 7 is a schematic drawing of another modified version of the coil spring unit in the first embodiment.

Figure 8:
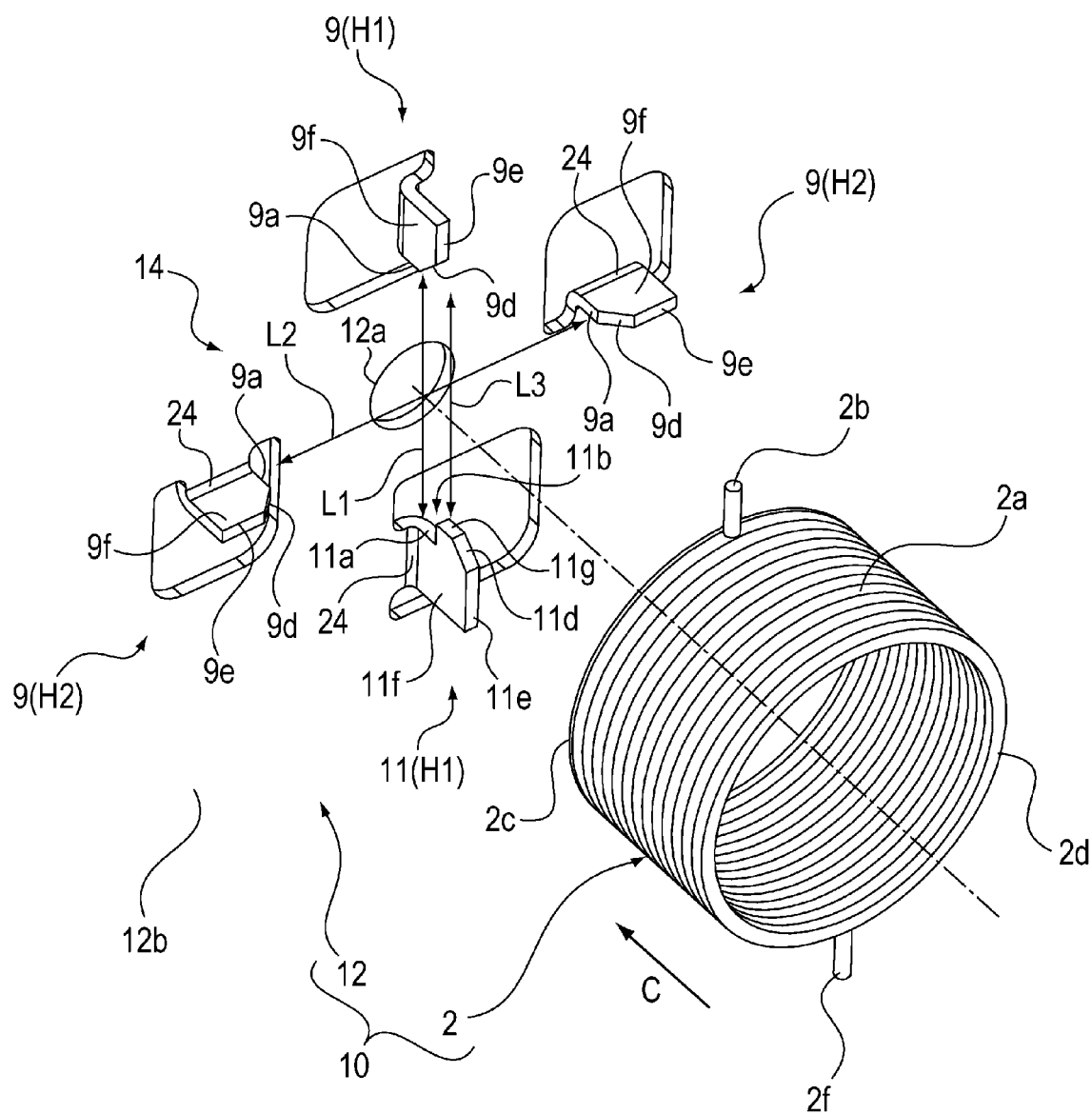

FIG. 8 is an exploded perspective view of the modified version of coil spring unit shown in FIG. 7; it is for showing how the unit is assembled.

Figure 9:
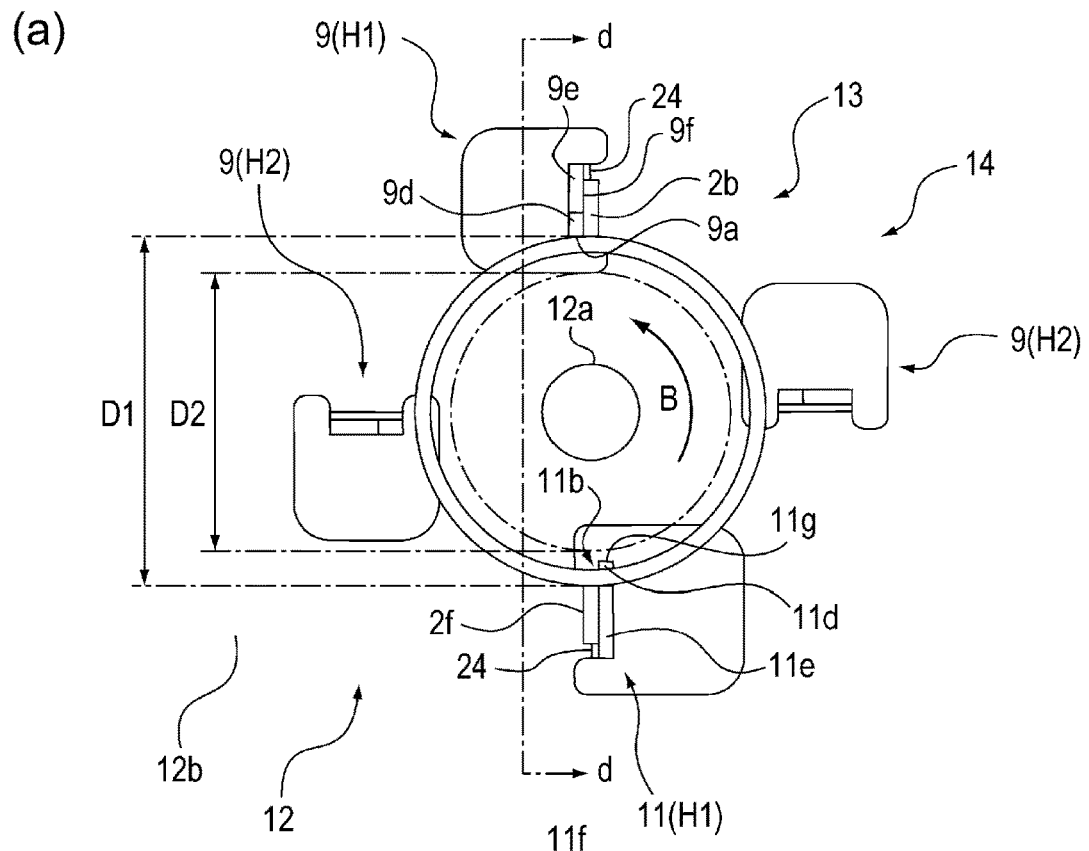
Figure 9:
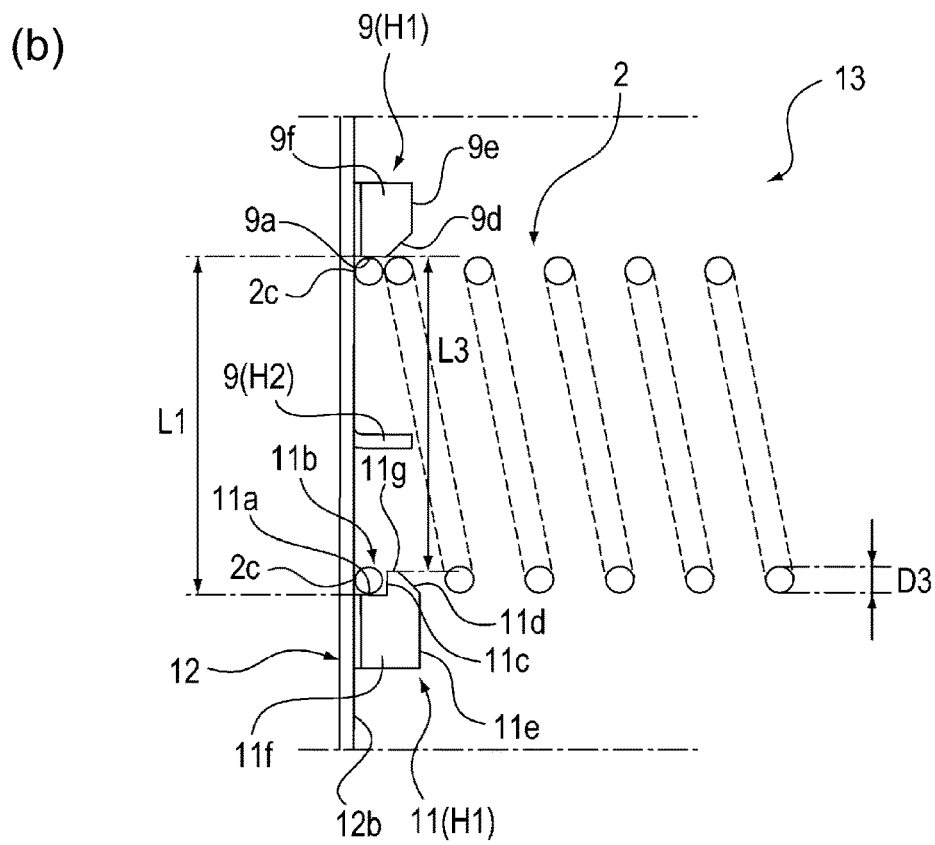

Part (a) of FIG. 9 is a side view of the assembled coil spring unit in the second embodiment of the present invention, and part (b) of FIG. 9 is a sectional view taken along plane d-d in part (a) of FIG. 9.

Figure 10:
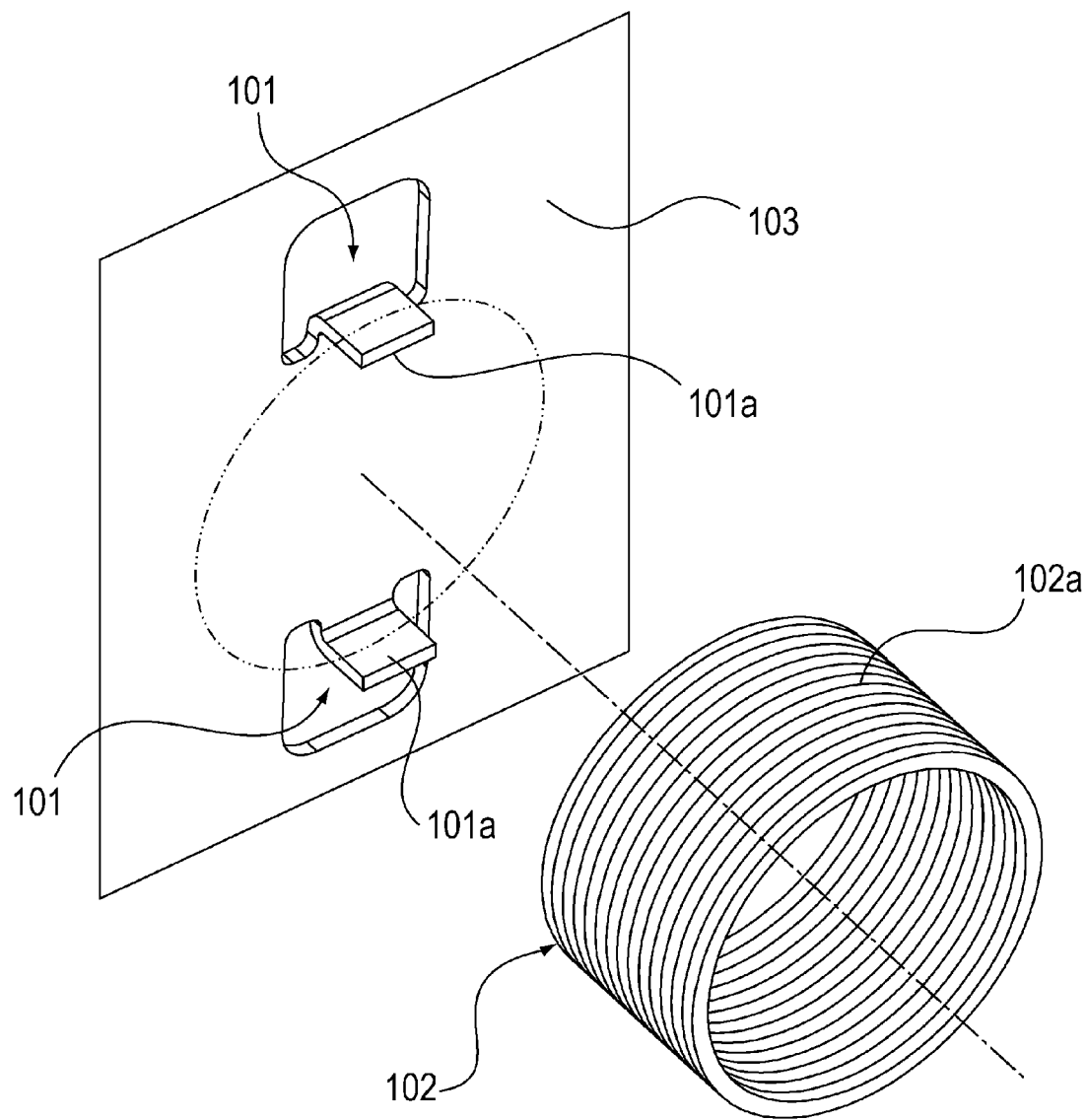

FIG. 10 is an exploded perspective view of a comparative (conventional) coil spring unit.

DESCRIPTION OF THE EMBODIMENTS

Embodiment 1

Hereafter, referring to FIGS. 1-7, the structure of the coil spring unit, mechanical force transmitting device, and image forming apparatus in the first embodiment of the present invention are described.

<Image Forming Apparatus>

Figure 1:
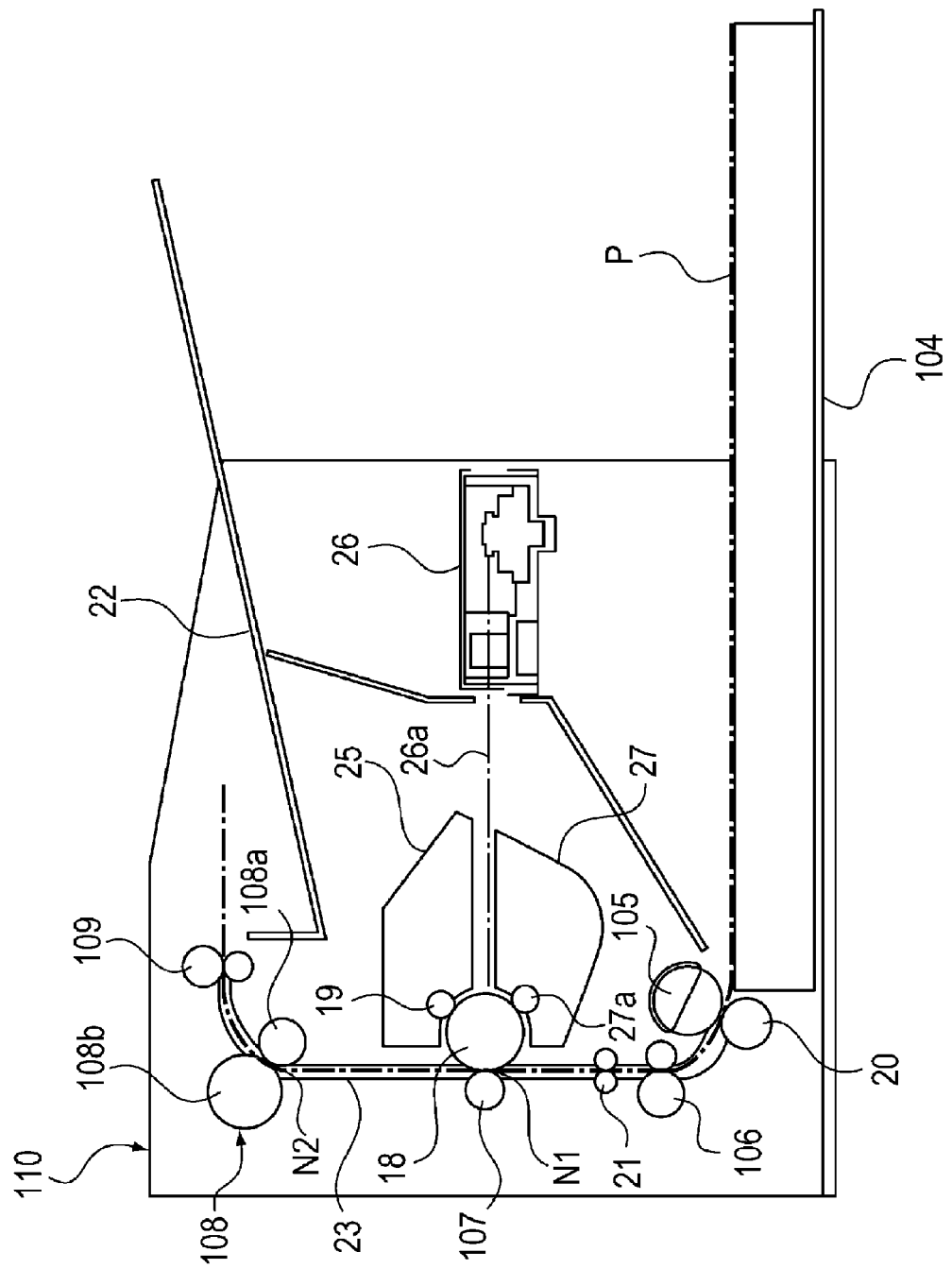
FIG. 1 is a sectional view of a typical image forming apparatus which is compatible with the present invention; it shows the general structure of the apparatus.

FIG. 1 is a sectional view of the image forming apparatus 110, which is for showing the structure of the image forming apparatus 110. The image forming apparatus 110 shown in FIG. 1 has a photosensitive drum 18, which is an image bearing member. The photosensitive drum 18 is rotationally driven by a motor 7 shown in FIG. 2, in the clockwise direction of FIG. 1.

While the photosensitive drum 18 is rotated in the clockwise direction of FIG. 1, the photosensitive drum 18 is uniformly charged by a charge roller 19. The uniformly charged peripheral surface of the photosensitive drum 18 is scanned by a beam 26a of laser light projected from a laser scanner 26 while being modulated according to the information of the image to be formed. Consequently, an electrostatic latent image, which reflects the information of the image to be formed, is effected on the peripheral surface of the photosensitive drum 18.

To the electrostatic latent image formed on the peripheral surface of the photosensitive drum 18, toner (developer) is supplied by a development roller 27a, with which a developing apparatus 27 is provided. Thus, the electrostatic latent image is developed into a toner image. The developing apparatus 27 is provided with an unshown stirring member for stirring the developer, the aforementioned development roller 27a, and an unshown supply roller which is for supplying the development roller 27a with the developer in the developer container. These rollers also are rotationally driven by a motor 7 shown in FIG. 2.

Meanwhile, the sheets P of recording medium stored in a sheet feeder cassette 104 are moved one by one out of the cassette 104, and into the main assembly of the image forming apparatus 110, by the coordination of a feed roller 105 and a separation roller 20. Then, each sheet P of recording medium is conveyed further by a pair of conveyance rollers 106, while remaining pinched by the pair of conveyance rollers 106, until it comes into contact with the nip of a pair of registration rollers 21, which are remaining stationary. As the sheet P is pressed frontward with respect to the sheet conveyance direction, with its leading edge remaining in contact with the nip, it is corrected in attitude by its resiliency, if it was conveyed askew.

Thereafter, the sheet P of recording medium is conveyed to the transfer nip N1 formed between the photosensitive drum 18 and a transfer roller 107, by the pair of registration rollers 21, while remaining pinched by the pair of registration rollers 21, in synchronism with the timing with which the toner image formed on the peripheral surface of the photosensitive drum 18 arrives at the transfer nip N1.

As transfer bias is applied to a transfer roller 107 from an unshown transfer bias power source, the toner image formed on the peripheral surface of the peripheral surface of the photosensitive drum 18 (image bearing member) is transferred onto the sheet P of recording medium. The transfer roller 107 is rotationally driven by the motor 7 shown in FIG. 2. Transfer residual toner, that is, the toner remaining on the peripheral surface of the photosensitive drum 18 after the transfer, is scraped away by an unshown cleaning blade, and then, is recovered into a cleaner 25.

After the transfer of an unfixed toner image onto the sheet P of recording medium in the transfer nip N1, the sheet P is conveyed to a fixing apparatus 108 by the combination of the photosensitive drum 18 and transfer roller 107 while remaining pinched by the combination, and then, is conveyed through the fixing apparatus 108 while remaining pinched between the fixation roller 108a and pressure roller 108b of the fixing apparatus 108. While the sheet P is conveyed through the fixing apparatus 108, the unfixed toner image on the sheet P is thermally fixed to the sheet P; it is melted by the fixation roller 108a, and becomes fixed to the sheet P as it cools down. The fixation roller 108a and pressure roller 108b also are rotationally driven by the motor 7 shown in FIG. 2.

After being conveyed by the combination of the fixation roller 108a and pressure roller 108b while remaining pinched by the two rollers 108a and 108b, the sheet P is conveyed further by a pair of discharge rollers 109 while remaining pinched by the discharge rollers 109, and then, is discharged onto a delivery tray 22 by the discharge rollers 109. The discharge rollers 109 also are rotationally driven by the motor 7 shown in FIG. 2.

The feed roller 105, conveyance rollers 106, registration rollers 21, transfer roller 107, photosensitive drum 18, fixation roller 108a, pressure roller 108b, discharge rollers 109, which are shown in FIG. 1, function as rotational members for conveying a sheet P of recording medium.

These rotational members also rotate by receiving rotational driving force (mechanical force) from the motor 7.

<Driving Force Transmitting Device>

Figure 2:
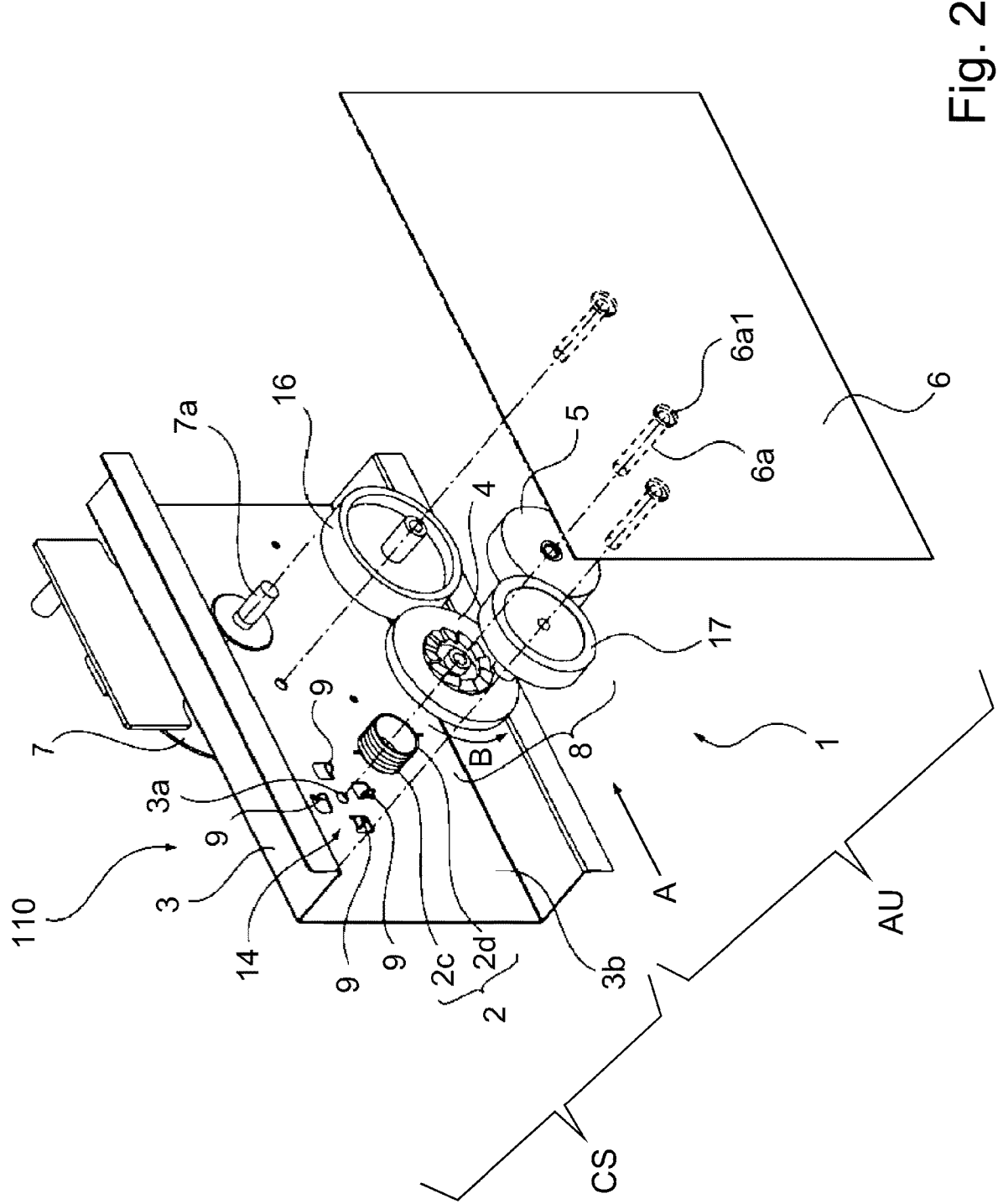
FIG. 2 is a perspective view of a mechanical force transmitting device equipped with a coil spring unit.
Figure 3:
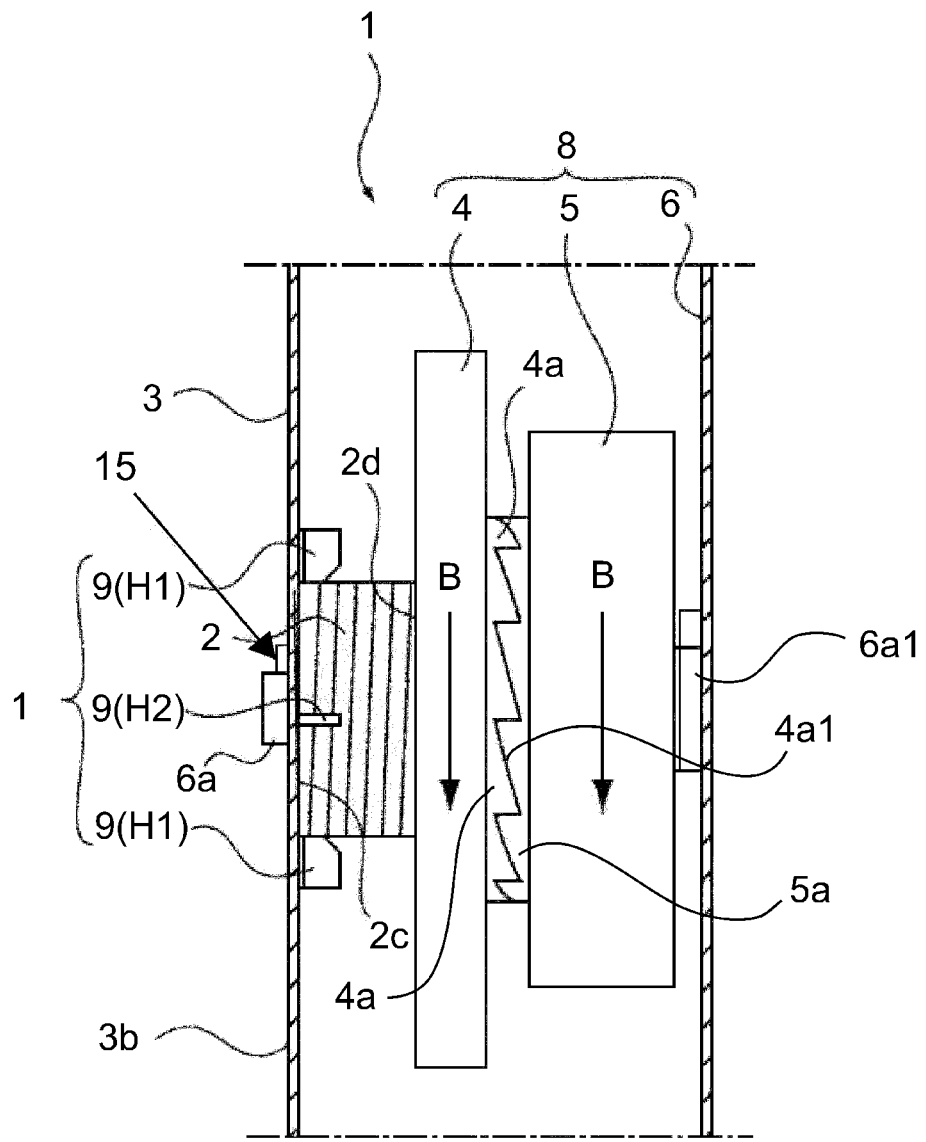
FIG. 3 is a side view of the mechanical force transmitting device equipped with a coil spring unit, shown in FIG. 2.

Next, referring to FIGS. 2 and 3, a driving force transmitting device 1 having the coil spring unit CS in this embodiment is described about its structure. FIG. 2 is a perspective view of the driving force transmitting device 1. FIG. 3 is a side view of the driving force transmitting device 1, as seen from the direction indicated by an arrow mark A in FIG. 2. It also shows the structure of the apparatus 110. By the way, for convenience sake, some parts of the driving force transmitting device 1 are not shown in FIG. 3.

Referring to FIGS. 2 and 3, the image forming apparatus 110 is structured so that its side plate 3 is utilized as a part of the driving force transmitting device 1. The driving force transmitting device 1 shown in FIGS. 2 and 3 has the first side plate 3 (metallic plate), the motor 7 attached to the side plate 3, a driving force transmitting portion 8, and the second side plate 6. This side plate 3 (coil spring holding member) is provided with a spring retaining portion 14.

The coil spring unit CS has: a coil spring 2 (compression spring); and the first side plate 3, as a supporting member, to which the coil spring 2 is attached in such a manner that one (2c) of the lengthwise end surfaces of the coil spring 2 in terms of the direction which is parallel to the axial line of the coil spring 2 remains in contact with a the first side plate 3. Further, the driving force transmitting device 1 has a gear assembly (gear train) unit AU which is in contact with the other end surface 2d of the coil spring 2 with respect to the direction parallel to the axial line of the coil spring 2, that is, the opposite end surface of the coil spring 2 from the end surface 2c which is in contact with the first side plate 3 (supporting member). The coil spring 2 is held by the combination of the first side plate 3 (supporting member) and transmission gear assembly unit AU, by being sandwiched by the combination.

<Transmission Gear Assembly Unit AU>

The transmission gear assembly unit AU has: a driver gear which rotates by receiving rotational driving force from the motor 7 (driving force source); a follower gear 5 which is rotated by the driver gear 4; the second side plate 6 which has a pair of shafts by which the driving gear 4 and follower gear 5 are rotatably supported, one for one. In this embodiment, the driver gear 4 which rotationally slides on the other end surface 2d of the coil spring 2, and the follower gear 5, are in connection to each other through a one-way clutch which comprises a ratchet portion 4a, with which the driver gear 4 is provided, and a ratchet portion 5a, with which the follower gear 5 is provided.

The driver gear 4 and follower gear 5 are rotatably supported by a shaft 6a with which the second side plate 6 is provided. The coil spring 2 is held to the first side plate 3 so that its axial line coincides with the axial line of the shaft 6a. The follower gear 5 is supported by the shaft 6a so that it is allowed to rotationally slide on a follow gear seat 6a1 with which the second side plate 6 is provided. To the driver gear 4, rotational driving force is transmitted from the drive shaft 7a of the motor 7 (driving force source) by way of an idler gear 16. As the rotational driving force is transmitted to the driver gear 4, it is transmitted to the follower gear 5 by way of the ratchet portions 4a and 5a, rotating thereby the follower gear 5. As the rotational driving force is transmitted to the follower gear 5, it is transmitted to the aforementioned various rotational members of the image forming apparatus 110 by way of a gear 17.

Referring to FIG. 3, the coil spring 2, driver gear 4, and follower gear 5 are held sandwiched between the first side plate 3 and second side plate 6. Further, the shaft 6a, with which the second side plate 6 is provided, is put though a central through hole, with which the follower gear 5 is provided, a central through hole, with which the driver gear 4 is provided, and a through hole 3a, with which the first side plate 3 is provided. Then, it is locked to the first side plate 3 with a locking member 15 such as an E ring. Thus, the driver gear 4 and follower gear 5 are supported by the shaft 6a in such a manner that they are rotatable about the shaft 6a.

<Operation of Driving Force Transmitting Device>

Next, referring to FIGS. 2 and 3, the driving force transmitting device 1 is described about its operation. The drive shaft 7a of the motor 7, shown in FIG. 2, which is a source of the driving force, rotates in response to the signal which it receives from the unshown controller of the driving force transmitting device 1. As the drive shaft 7a of the motor 7 rotates, the idler gear 16 is rotated by the rotation of the drive shaft 7a. Consequently, the driver gear 4, which is in mesh with the idler gear 16, rotates.

Referring to FIG. 3, therefore, the follower gear 5 is rotated by the rotation of the driver gear 4 by way of the ratchet portion 4a of the driver gear 4, and the ratchet portion 5a of the follower gear 5, which is in mesh with the ratchet portion 4a of the driver gear 4. In addition, the gear 17, which is in mesh with the follower gear 5, rotates. This is how the driving force transmitting portion 8 is rotationally driven. Further, the various rotational members of the image forming apparatus 110 are rotated by the driving force transmitted thereto by way of the gear train, which is in mesh with the gear 17 of the driving force transmitting portion 8. Since the rotational driving force is transmitted to the rotational members of the aforementioned conveying means, the sheet P of recording medium can be conveyed.

Next, referring to FIGS. 2 and 3, the operation of the driver gear 4 and that of the follower gear 5 are described. As the rotational driving force of the motor 7 is transmitted to the driver gear 4 by way of the idler gear 16, the driver gear 4 rotates in the direction indicted by an arrow mark B in FIG. 2. The driver gear 4 always remains pressed toward the follower gear 5 (rightward in FIG. 3) by the resiliency of the coil spring 2. Thus, as the driver gear 4 rotates in the direction indicated by the arrow mark B, the ratchet portion 4a of the driver gear 4 and the ratchet portion 5a of the follower gear 5 mesh with each other, and therefore, the follower gear 5 rotates with the driver gear 4 in the direction indicated by the arrow mark B in FIG. 3.

The fixation roller 108a and pressure roller 108b of the fixing apparatus 108 are rotated by the driving force transmitted thereto through the gear 17, which is in mesh with the follower gear 5, and an unshown gear train. The fixing apparatus 108 thermally fixes the unfixed toner image transferred onto the sheet P of recording medium, to the sheet P by applying heat and pressure to the sheet P and the unfixed toner image thereon; the unfixed toner image is melted by the heat applied thereto, and becomes fixed to the sheet P as it cools down. If a sheet conveyance passage 23 is jammed by a sheet P of recording medium while the sheet P is being conveyed through the fixation nip N2 between the fixation roller 108a and pressure roller 108b, while remaining pinched between the two rollers 108a and 108b, a user is to stop the motor 7 of the image forming apparatus 110, and then, remove the sheet P.

As a user pulls the sheet P of recording medium, which is remaining pinched in the fixation nip N2 between the fixation roller 108a and pressure roller 108b, the fixation roller 108a and pressure roller 108b are rotated by the sheet P because of the presence of the friction between the sheet P and fixation roller 108a, and the friction between the sheet P and pressure roller 108b.

Thus, the follower gear 5 is rotated in the direction indicated by the arrow mark B in FIG. 3, by the rotation of the fixation roller 108a and that of the pressure roller 108b, which are transmitted to the follower gear 5 by way of an unshown gear train, and the gear 17. However, the driver gear 4 remains stationary, because the motor 7 of the driving force transmitting device 1 is not rotating. If the follower gear 5 rotates in the direction indicated by the arrow mark B in FIG. 3 while the driving force transmitting device 1 is in the above-described state, the slanted surface 4a1 of each of the protrusive portions (tooth portions) of the ratchet portion 5a of the follower gear 5 presses on the slanted surface of the corresponding protrusive portion of the ratchet portion 4a of the driver gear 4. Consequently, the driver gear 4 moves leftward against the resiliency of the coil spring 2. Thus, the amount of force which the user has to exert to dislodge the sheet which is remaining pinched by the fixation roller 108a and pressure roller 108b, from the fixation nip N2 in order to remove the jammed sheet from the image forming apparatus 110, is relatively small.

<Spring Holding Portion>

Figure 4:
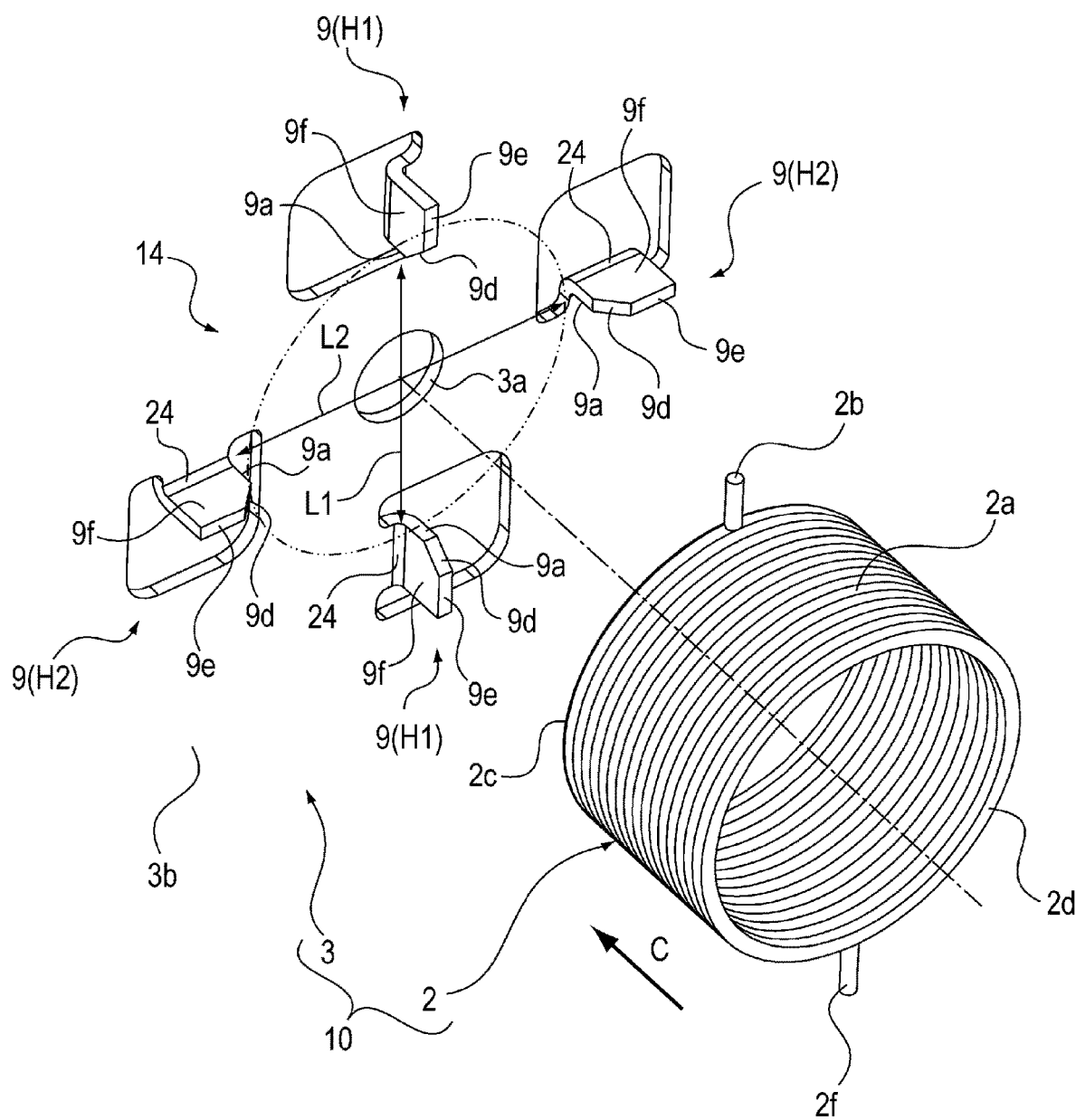
FIG. 4 is an exploded perspective view of the coil spring unit; it shows the process of assembling the unit.

Next, referring to FIGS. 4 and 5, the spring holding portion 14, with which the first side plate 3 is provided is described about its structure. FIG. 4 is a perspective view of the spring holding portion 14 and coil spring 2 prior to the attachment of the coil spring 2 to the spring holding portion 14. Part (a) of FIG. 5 is a perspective view of the spring holding portion 14 and coil spring 2 after the attachment of the coil spring 2 to the spring holding portion 14. It shows the structure of the assembled combination of the coil spring 2 and spring holding portion 14. Part (b) of FIG. 5 is a side view of the assembled combination 10 of the spring holding portion 14 and coil spring 2, as seen from the direction indicated by an arrow mark C in FIG. 4 and part (a) of FIG. 5.

The first side plate 3 shown in FIG. 4 has four (multiple) spring retaining portions 9, which are integral parts of the first side plate 3. The spring retaining portions 9 are formed by subjecting the first side plate 3 to a punching process and a bending process. They protrude inward of the spring holding portion 14 perpendicular to the surface 3b of the first side plate 3. It is by these spring retaining portions 9 that the coil spring 2 is held to the first side plate 3.

The top and bottom spring retaining portions 9(H1), which are in vertical alignment with each other as shown in FIG. 4, are the same in the direction in which they are bent relative to the first side plate 3, with respect to the circumferential direction of the through hole 3a with which the first side plate 3 is provided. The left and right spring retaining portions 9(H2), which are in horizontal alignment with each other as shown in FIG. 4, are the same in the direction in which they are bent relative to the first side plate 3, with respect to the circumferential direction of the through hole 3a with which the first side plate 3 is provided. Further, the four spring retaining portions 9 (pair of spring retaining portions 9(H1) and pair of spring retaining portions 9(H2)) are positioned 90 degrees apart with respect to the circumferential direction of the hole 3a. It is through the hole 3a of the first side plate 3 that the tip portion of the shaft 6a is put.

Each spring retaining portion 9 has a lateral surface 9a, as a spring retaining surface, which occurs during the aforementioned punching process. The lateral surface 9a is roughly perpendicular to the line 24 of bending, that is, the line along which the spring retaining portion 9 was bent relative to the main portion of the first side plate 3 during the aforementioned bending process. Referring to parts (a) and (b) FIG. 6, it is by this lateral surface 9a (retaining surface) that the coil spring 2 is held to the first side plate 3 by its peripheral portion 2a. Instead, the first side plate 3 may be structured so that the coil spring 2 is supported by its inward side 2e, by the lateral surface 9a (retaining surface) as shown in part (a) of FIG. 6. As described above, the lateral surface 9a (retaining surface) is a surface for retaining the coil spring 2, and is roughly perpendicular to the line 24 along which the precursor of the spring retaining portion 9 is bent during the bending process.

The first side plate 3 is structured so that the pair of spring retaining portions 9 having the lateral surface 9a are separated by 180° from each other with respect to the circumferential direction of the hole 3a, and also, that the two lateral surfaces 9a oppose each other. The distance L1 between the lateral surface 9a of one of the pair of retaining portions 9(H1), and the lateral surface 9a of the other of the pair of retaining portions 9(H1), is roughly the same as the diameter D1 of the peripheral portion 2a of the coil spring 2. Thus, the coil spring 2 can snugly fit between the lateral surface 9a of one of the pair of coil retaining portions 9(H1), and that of the other of the pair of coil retaining portions 9(H1), in such a manner that the peripheral portion 2a of the coil spring 2 remains in contact with the lateral surfaces 9a in practical terms.

The distance L2 between the lateral surface 9a of one of the pair of retaining portions 9(H2), and the lateral surface 9a of the other of the pair of retaining portions 9(H2), is set to be roughly 1 mm greater than the distance L1 (L2>L1). Although the coil spring 2 is held to the first side plate 3 in such a manner that it is sandwiched between the lateral surface 9a of one of the pair of retaining portions 9(H1) and that of the other of the pair of retaining portions 9(H1), if the coil spring 2 is displaced in such a horizontal direction that is parallel to the surface 3b of the first side plate 3, it comes into contact with the lateral surface 9a of one of the pair of retaining portions 9(H2) (retained by lateral surface 9a).

Referring to FIG. 4, each coil spring retaining portion 9 has a top surface 9e (end surface in terms of left-right direction in FIG. 3) and a lateral surface 9a (spring retaining surface), which resulted during the aforementioned punching process. Further, each coil spring retaining portion 9 has a surface 9d which was created by chamfering the corner between the top surface 9e and lateral surface 9a. By the way, it is not mandatory that all the spring retaining portions 9 are provided with the surface 9d (surface created by chamfering). That is, all that is necessary is that at least one of the multiples spring retaining portions 9 is provided with the surface 9d (created by chamfering). The presence of surfaces 9d makes it easier for a user to insert the coil spring 2 into the space surrounded by the four coil spring retaining portions 9 (surfaces 9a), since the coil spring 2 is guided by one (2c) of its lengthwise ends, with respect to the axial line of the coil spring 2 when the coil spring 2 is inserted into the space surrounded by the four lateral surfaces 9a of the four retaining portions 9.

Referring to FIG. 4, the coil spring 2 is formed by spirally winding a piece of wire. The lengthwise end portions of the piece of wire are bent outward of the coil spring 2 with respect to the radius direction of the coil spring 2, yielding thereby two bent portions 2b and 2f.

As the driver gear 4 is rotated in the direction indicated by the arrow mark B in FIG. 2, the friction between the aforementioned other end surface 2d of the coil spring 2, and the driver gear 4, acts on the coil spring 2 in a manner to rotate the coil spring 2. However, as the coil spring 2 begins to rotate, the bent portion 2b comes into contact with the one of the coil spring retaining portions 9, preventing therefore the coil spring 2 from rotating further. Thus, it is possible to prevent the coil spring 2 from rotating with the driver gear 4. That is, each of the lengthwise ends of the piece of wire of which the coil spring 2 is formed is bent to provide the coil spring 2 with the bent portion 2b (2f) which is protrusive beyond the periphery of the coil spring 2. Thus, as the friction between the coil spring 2 and driver gear 4 begins to rotate the coil spring 2, the bent portion 2b comes into contact with one of the multiple coil spring retaining portions 9, and therefore, the coil spring 2 is prevented from rotating further.

<First Step in Operation to Assembling Driving Force Transmitting Device>

Next, referring to FIGS. 4 and 5, how to assemble the driving force transmitting device 1 is described. Referring to part (a) of FIG. 5, first, an assembler is to insert the coil spring 2 (in direction indicated by arrow mark C) into the space surrounded by the four coil spring retaining portions 9 (four lateral surfaces 9a) so that one (2c) of the lengthwise end surfaces of the coil spring 2 comes into contact with the surface 3b of the first side plate 3. As the coil spring 2 is inserted, it is held to the first side plate 3, between the pair of retaining portions 9(H1), which are separated from each other by the distance L1 (between two surfaces 9a). Thus, this structural arrangement can reduce the possibility that the coil spring 2 will dislodge from the space surrounded by the four retaining portions 9. That is, it improves the coil spring unit CS in the efficiency with which the coil spring unit CS can be assembled.

After the completion of the first step in the process of assembling the driving force transmitting device 1, the combination of the coil spring 2 and first side plate 3 is referred to as an assembly 10.

<Second Step in Operation to Assemble Driving Force Transmitting Device>

After the completion of the above-described step in the operation for assembling the driving force transmitting device 1, the assembler is to attach the assembly 10 to the driving force transmitting device 1 to which the second side plate 6, follower gear 5, and driver gear 4, which are shown in FIG. 2, have just been attached.

<Reason for Retaining Coil Spring 2 by Lateral Surfaces 9a (Retaining Surfaces)>

The multiple coil spring retaining portions 9 are created by subjecting the first side plate 3 to the punching process and bending process in succession. Each of the multiple retaining portions 9 has a lateral surface 9a which is roughly perpendicular to the line, along which the precursor of each retaining portion 9 is bent to yield the retaining portion 9. That is, the coil spring unit CS is structured so that as the coil spring 2 is inserted into the space surrounded retaining portions 9, a line which coincides with the point of contact between the peripheral portion 2a of the coil spring 2, and the retaining portion 9, and is tangential to the peripheral portion of the coil spring 2, becomes roughly parallel to the lateral surface 9a of the retaining portion 9. Thus, the lateral surface 9a of each of the multiple retaining portions 9 functions as a surface for retaining the coil spring 2.

Even if the multiple coil spring retaining portions 9 are different in the angle at which they are bent in the bending process, the amount of the positional deviation of the lateral surface 9a (coil spring retaining surface) with respect to the radial direction of the coil spring 2 is relatively small. That is, the effect of the bending process upon the distance L1 between the mutually opposing two surfaces 9a is relatively small. Thus, this embodiment can improve the coil spring unit CS in the accuracy with which the coil spring 2 is attached to the first side plate 3.

That is, the distance L1 between the mutually opposing lateral surfaces 9a is set primarily by the measurements of the metallic mold used to make the coil spring retaining portions 9 through the punching process (effect of bending process is small). Therefore, each lateral surface 9a is highly precisely positioned relative to the main portion of the first side plate 3.

Because it is possible to prevent the problem that when a substantial number of the first side plate 3 are manufactured, they are different in the amount of the distance L1. Therefore, it is unlikely to occur that the coil spring 2 dislodges from the first side plate 3, and falls, during the second step in the operation for assembling the driving force transmitting device 1.

<Operation to Twist Coil Spring>

By the way, it is possible to utilize the bent portion 2b of the coil spring 2 in the first step in the operation for assembling the driving force transmitting device 1, as follows. First, an assembler is to insert the coil spring 2 into the space surrounded by the four lateral surfaces 9a. Then, the assembler is to rotate the coil spring 2 in the direction indicated by the arrow mark B in part (b) of FIG. 5 so that the bent portion 2b of the coil spring 2 comes into contact with the surface 9f of one of the coil spring retaining portions 9. Then, the assembler is to rotate the coil spring 2 further in the direction indicated by the arrow mark B in part (b) of FIG. 5, that is, the direction in which the piece of wire was wound to form the coil spring 2, so that the coil spring 2 is twisted.

As the coil spring 2 is twisted, the diameter D1 of the peripheral portion 2a of the coil spring 2 (external diameter of coil spring 2) reduces to a diameter D2, which is indicated by a broken line in part (b) of FIG. 5 (D2<D1). That is, while the coil spring 2 is remaining twisted in the direction indicated by the arrow mark B in part (b) of FIG. 5, the diameter D2 of the peripheral portion 2a of the coil spring 2 is sufficiently smaller than the distance D1. Thus, the assembler is to insert the coil spring 2 further into the space surrounded by the four lateral surfaces 9a until the one (2c) of the lengthwise end surfaces of the coil spring 2 in terms of the direction parallel to the axial line of the coil spring 2 comes into contact with the surface 3b of the first side plate 3 while keeping the coil spring 2 twisted as described above.

Then, the assembler is to release the coil spring 2 while keeping the one (2c) of the lengthwise end surfaces of the coil spring 2 in contact with the surface 3b of the first side plate 3. Consequently, the external diameter D1 of the peripheral portion 2a of the coil spring 2 is increased to the normal one D1 (>D2) by the resiliency of the coil spring 2. Thus, it is ensured that the coil spring 2 is retained between the top and bottom lateral surfaces 9a; it is remain securely held to the first side plate 3.

<Modified Version 1 of Embodiment 1>

In the first embodiment described above, the coil spring unit CS was structured so that the coil spring 2 is held to the first side plate 3 by coil spring retaining portions 9 of the first side plate 3, by being sandwiched by its peripheral portion 2a, by the retaining portions 9. Part (a) of FIG. 6 is a side view of the combination of the coil spring retaining portions 9 of the first side plate 3, and the coil spring 2, in the first modified version of the first embodiment. In the first modified version of the first embodiment, which is shown in part (a) of FIG. 6, the first side plate 3 is structured so that the lateral surface 9a of the top retaining portion 9, and the lateral surface 9a of the bottom retaining portion, face the inward side 2e of the coil spring 2, and the slant surface 9d is formed by chamfering the corner between the lateral surface 9a and top surface 9e. That is, it is structured so that the coil spring 2 is retained by its inward side 2e, by the two (top and bottom) lateral surfaces 9a, shown in part (a) of FIG. 6. By the way, if the coil spring 2 is displaced, not only is it retained by the two (top and bottom) lateral surfaces 9a, but also, the lateral surface 9a of one of two (left and right) coil spring remaining portions 9(H2).

<Modified Version 2 of Embodiment 1> part (b) of FIG. 6 is a side view of the combination of the coil spring retaining portions 9 of the first side plate 3, and the coil spring 2, in the second modified version of the first embodiment. In the second modified version of the first embodiment, which is shown in part (b) of FIG. 6, the first side plate 3 is provided with three coil spring retaining portions 9, which were made through the punching process and bending process. The three retaining portions 9 are separated by 120° in terms of the circumferential direction of the through hole 3a with which the first side plate 3 is provided. Thus, the coil spring 2 is retained by the lateral surface 9a of each of the three remaining portions 9, by its peripheral portion 2a. By the way, the first side plate 3 may be provided with four or more coil spring retaining portions 9 so that the coil spring 2 is retained by its inward portion, by the lateral surface 9a of each of the four or more retaining portions 9.

<Modified Version 3 of Embodiment 1>

FIG. 7 is a side view of the combination of the coil spring retaining portions 9 of the first side plate 3, and the coil spring 2, in the third modified version of the first embodiment. In the preceding embodiments of the present invention, which were shown in FIG. 6 and preceding drawings, the first side plate 3 were structured so that the coil spring retaining portions 9 (H2) face the peripheral portion 2a of the coil spring 2. However, the surface of the retaining portion 9(H2), which faces the peripheral portion 2a of the coil spring 2, has only to loosely retain the coil spring 2 by the peripheral portion 2a of the coil spring 2. Thus, it is not required to be very precisely positioned. Therefore, the first side plate 3 may be structured so that the other surface of the coil spring supporting portion than the lateral surface 9a, which results as the first side plate 3 is subjected to the punching process, faces the peripheral portion 2a of the coil spring 2.

Thus, in this modified version of the first embodiment, the first side plate 3 is structured so that instead of one of the surfaces of each of the coil spring retaining portion 9(H2), which results as the first side plate 3 is subjected to the punching process, a surface 9f, which is a part of the surface 3b of the first side plate 3, faces the peripheral portion 2a of the coil spring 2.

The coil spring unit CS shown in FIG. 7 is structured so that the two (top and bottom) coil spring retaining portions 9(H1) sandwich the coil spring 2 in such a manner that their lateral surface 9a contacts the peripheral portion 2a of the coil spring 2. This is how the coil spring 2 is fixed to the first side plate 3.

The distance L1 between the two lateral surfaces 9a is determined by the measurements of the metallic die used to make the coil spring retaining portions 9 by subjecting the first side plate 3 to the punching process. Therefore, the distance L1 between the lateral surfaces 9a of one of the pair of retaining portions 9, and that of the other retaining portion 9, can be highly accurately set. Thus, it does not occur that the coil spring 2 dislodges from the first side plate 3 and falls during the operation for assembling the driving force transmitting device 1. That is, this modified version of the first embodiment can also increase the efficiency with which the driving force transmitting device 1 is assembled.

Embodiment 2

Next, referring to FIGS. 8 and 9, the combination of the coil spring supporting portion of the first side plate, and the coil spring, in the second embodiment of the present invention is described about its structure. By the way, the portions of the first side plate and coil spring in this embodiment, which are the same in structure as the counterparts in the first embodiment, are given the same referential codes as those given to the counterparts, and are not described. Further, even if a given portion of the first side plate or coil spring in this embodiment is different in referential code from the counterpart in the first embodiment, it is not described as long as the former is the same in structure as the counterpart. FIG. 8 is a perspective view of the combination of the first side plate and coil spring in this embodiment, prior to the attachment of the coil spring 2 to the first side plate 12. Part (a) of FIG. 9 is a side view of the combination, as seen from the direction indicated by an arrow mark C in FIG. 8, after the attachment of the coil spring 2 to the first side plate 12. It shows the structure of the assembly 10. Part (b) of FIG. 9 is a sectional view of the assembly 10 at a plane d-d in part (a) of FIG. 9.

<Apparatus Main Assembly>

First, referring to FIGS. 2, 3 and 8, the driving force transmitting device 1 in this embodiment is described about its structure. The driving force transmitting device 1 in this embodiment is virtually the same as that in the first embodiment, except that in this embodiment, the first side plate 12 is employed in place of the first side plate 3 shown in FIGS. 2 and 3. Thus, it is not described in detail in order not to repeat the same descriptions.

<Coil Spring Retaining Portions>

Next, referring to FIG. 8, the coil spring retaining portions 9 and 11, with which the first side plate 12 is provided, are described about their structure. Referring to FIG. 8, the first side plate 12 in this embodiment is provided with three coil spring retaining portions 9 and one coil spring retaining portion 11, which were made by a piece of metallic plate through a punching process and a bending process. In terms of the circumferential direction of a hole 12a, with which the first side plate 12 is provided, the direction in which the top retaining portion 9(H1) and bottom retaining portion 11 are bent, and the direction in which the left and right retaining portions 9(H2) are bent, are the same. Further, the retaining portions 9 and 11 are separated by 90 degrees in terms of the circumferential direction of the hole 12a.

The coil spring retaining portions 9 are the same in structure as those in the first embodiment. Thus, their structure is not described in detail in order not to repeat the same descriptions. The coil spring retaining portion 11 in this embodiment has a lateral surface 11a, which resulted when the retaining portion 11 was made through the punching process. The first side plate 12 is structured so that the top and bottom retaining portions 9 and 11 are separated by 180 degrees in terms of the circumferential direction of the hole 12a, and also, that the lateral surface 9a of the retaining portion 9(H1) and the lateral surface 11a of the retaining portion 11 face each other across the hole 12a. The distance between the lateral surface 9a of the top retaining portion 9(H1) and the lateral surface 11a of the bottom retaining portion 11 is roughly equal to the diameter D1 of the peripheral portion 2a of the coil spring 2. Thus, as the coil spring 2 is inserted between the lateral surfaces 11a and 9a, it is retained by the retaining portions 11 and 9, by its peripheral portion 2a.

The distance L2 between the lateral surface 9a of one of the two (left and right) coil spring retaining portions 9(H2), and that of the other coil spring retaining portion 9(H2) is set to be roughly 1 mm larger than the distance L1.

Further, the lateral surface 11a of the coil spring retaining portion 11 has such a width that is equal to the diameter of the wire of which the coil spring 2 is made. Further, the retaining portion 11 has an offset surface 11g which is protrusive beyond the lateral surface 11a. Further, it is provided with a bottom surface 11c, which roughly vertically connects the lateral surface 11a and offset surface 11g. Thus, the combination of the lateral surface 11a and bottom surface 11c makes up a coil spring hooking portion 11b.

The coil spring hooking portion 11b is protrusive, in the radius direction (upward in part (b) of FIG. 9) of the coil spring 2, to the adjacencies of one of the edges of the lateral surface 11a (coil spring retaining surface), in terms of the thickness direction of the first side plate 12 (coil spring holding member). At least one among the multiple coil spring retaining portions is provided with the hooking portion 11b. When the coil spring 2 is in engagement with the hooking portion 11b, and the coil spring 2 is retained by the retaining portions 9 and 11, it is possible for the bent portion 2b (engaging portion) to be in contact with the surface 11f of the retaining portion 11. The surface 11f of the retaining portion 11 is a part of the surface 12b of the first side plate 12. The slant surface 11d is between the offset surface 11g and top surface 11e.

<First Step in Operation to Assemble Driving Force Transmitting Device>

Next, referring to FIGS. 8 and 9, the first step in the operation to assemble the driving force transmitting device 1 is described. In this embodiment, first, an assembler is to attach the coil spring 2, shown in FIG. 8, to the first side plate 12. Then, the assembler is to turn the coil spring 2 in the direction indicated by an arrow mark B in part (b) of FIG. 9 until the bent portion 2b of the coil spring 2 comes into contact with the surface 9f of the retaining portion 9. Then, the assembler is to twist the coil spring 2 in the direction indicated by the arrow mark B, with the bent portion 2b kept in contact with the surface 9f.

Consequently, the coil spring 2 reduces in diameter; the diameter of the peripheral portion 2a of the coil spring 2 reduces from D1 to D2 (<D1). That is, as the coil spring 2 is twisted in the direction indicated by the arrow mark B in part (a) of FIG. 9, the diameter of the peripheral portion 2a of the coil spring 2 becomes smaller than the distance L3 between the lateral surface 9a of the top retaining portion 9(H1), and the offset surface 11g of the bottom retaining portion 11.

Then, the assembler is to insert the coil spring 2 between the lateral surface 9a of the top retaining portion 9(H1), and the offset surface 11g of the retaining portion 11, while keeping the coil spring 2 in the state in which its diameter is D2.

Then, after one of the lengthwise end surfaces 2c of the coil spring 2 in terms of the direction parallel to the axial line of the coil spring 2 comes into contact with the surface 12b of the first side plate 12, the assembler is to release the coil spring 2 (stop keeping coil spring 2 twisted in direction indicated by arrow mark B in part (a) of FIG. 9). Consequently, the coil spring 2 recovers in diameter; the diameter of the peripheral portion 2a of the coil spring 2 returns to D1. Thus, the peripheral portion 2a of the coil spring 2 comes into contact with the lateral surface 9a of the retaining portion 9(H1) and lateral surface 11a of the retaining portion 11(H1), being thereby sandwiched by the two surfaces 9a and 11a. That is, the coil spring 2 becomes securely held to the first side plate 12. After the fixation of the coil spring 2 to the first side plate 12, the combination of the coil spring 2 and first side plate 12 is referred to as an assembly 13.

<Second Step in Operation to Assemble Driving Force Transmitting Device>

After the completion of the first step in the operation to assemble the driving force transmitting device 1, the assembler is to attach the assembly 13 to the drive train assembly having the second side plate 6, follower gear 5, and driver gear 4, which are shown in FIGS. 2 and 3. Like the lateral surface 9a, the lateral surface 11a also is unlikely to be affected by the bending process. That is, the bending process is unlikely to affect the distance L1. Therefore, it is unlikely for the coil spring 2 to dislodge from the first side plate 12, and fall.

Referring to part (b) of FIG. 9, in this embodiment, the coil spring 2 is anchored to the first side plate 12 by the coil spring hooking portion lib formed by the surface 12b of the first side plate 12, lateral surface 11a of the retaining portion 11, and the bottom surface of the retaining portion 11. Thus, even if an assembler accidentally touches the coil spring during the operation to assemble the driving force transmitting device 1, it is unlikely to occur that the coil spring 2 to dislodge from the first side plate 12, and fall.

By the way, in this embodiment, the first side plate 12 was provided with the three coil spring retaining portions 9 and one coil spring retaining portion 11. However, the embodiment is not intended to limit the present in scope in terms of the number and positioning of the coil spring retaining portions 9 and 11. For example, the present invention is also applicable to a driving force transmitting device having two or more coil spring retaining portions 11 in place of multiple coil spring retaining portions 9. Otherwise, the driving force transmitting device 1 in this embodiment is the same in structure, as well as effect, as that in the first embodiment. By the way, not only is the coil spring unit described above applicable to an image forming apparatus such as the image forming apparatus 110, but also, various apparatuses in various fields.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-240786 filed on Dec. 13, 2016, which is hereby incorporated by reference herein in its entirety.

What is claimed is:

1. A coil spring unit comprising:
a coil spring; and
a metal plate comprising a base plate, a plurality of through holes provided in the base plate, and a plurality of supporting portions, each supporting portion of the plurality of supporting portions projecting from the base plate and located in a boundary between the base plate and a corresponding through hole,
wherein a surface of the supporting portion crossing the boundary is contactable with the coil spring, and the plurality of supporting portions support the coil spring cooperative with each other to support the coil spring.

2. A coil spring unit according to claim 1, wherein the plurality of supporting portions includes four supporting portions provided substantially equidistantly,
wherein flat surface portions of a first pair of supporting portions are parallel with each other and separated from each other by a first distance,
wherein flat surface portions of a second pair of supporting portions are parallel with each other and separated from each other by a second distance, and
wherein the first distance is different from the second distance.

3. A coil spring unit according to claim 1, wherein an end portion of wire of the coil spring is bent to project beyond an outer periphery of the coil spring, and the bent end portion prevents rotation of the coil spring by abutting one of the supporting portions.

4. A coil spring unit according to claim 1, wherein the supporting portions support the coil spring at a plurality of locations on an outer periphery of the coil spring.

5. A coil spring unit according to claim 1, wherein the supporting portions support the coil spring at a plurality of locations on an inner periphery of the coil spring.

6. A coil spring unit according to claim 1, wherein at least one of the supporting portions is provided with a hook portion configured to prevent disengagement of the coil spring in an axial direction of the coil spring.

7. A drive force transmitting device comprising a clutch configured to transmit a driving force from a driving side to a driven side, the clutch including a coil spring unit according to claim 1.

* * * * *